United States Patent
Dobashi et al.

(10) Patent No.: US 6,556,693 B1
(45) Date of Patent: Apr. 29, 2003

(54) APPARATUS FOR EXAMINING THE DEGREE OF STAIN ON PRINTED MATTER

(75) Inventors: Hironori Dobashi, Tokyo (JP); Toshio Sato, Yokohama (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/378,919

(22) Filed: Aug. 23, 1999

(30) Foreign Application Priority Data

Aug. 24, 1998 (JP) .......................................... 10-236852

(51) Int. Cl.$^7$ ................................................. G06K 9/00
(52) U.S. Cl. ........................................ 382/112; 359/491
(58) Field of Search ................................ 382/112, 106; 250/390.06, 556; 347/131, 151, 254; 396/599; 359/491

(56) References Cited

U.S. PATENT DOCUMENTS

| | | | |
|---|---|---|---|
| 4,311,914 A | | 1/1982 | Huber |
| 5,210,600 A | * | 5/1993 | Hirata .......................... 358/527 |
| 5,640,187 A | * | 6/1997 | Kashiwazaki et al. ...... 347/101 |
| 5,734,933 A | * | 3/1998 | Sekine et al. .................. 396/55 |
| 5,841,518 A | * | 11/1998 | Kajiwara ...................... 335/40 |

FOREIGN PATENT DOCUMENTS

| | | |
|---|---|---|
| DE | 4434505 | 8/1995 |
| EP | 109490 | 5/1984 |
| GB | 2164442 | 3/1986 |

* cited by examiner

Primary Examiner—Timothy M. Johnson
Assistant Examiner—Abolfazl Tabatabai
(74) Attorney, Agent, or Firm—Pillsbury Winthrop LLP

(57) ABSTRACT

An area information storage section stores positional information on at least two target areas on the standard image of printed matter to be examined, the area of each of the target areas, their standard average densities, and the standard deviation of their density distribution. An average density computing section calculates the average density for each target area in the image data supplied from the image input section using positional information on each target area and its area supplied from the area information storage section. A density difference measuring means measures, target area by target area, the density difference between the average density and the standard average density supplied from the area information storage section. A density difference normalizing section normalizes the density difference and the standard deviation of the density distribution supplied from the area information storage section. On the basis of the added value of the normalized density difference for each of the target areas, a summing section judges the degree of stain on the printed matter to be examined.

11 Claims, 11 Drawing Sheets

APPARATUS FOR EXAMINING THE DEGREE OF STAIN ON PRINTED MATTER

BACKGROUND OF THE INVENTION

This invention relates to a degree-of-stain-on-printed-matter examining apparatus for examining the degree of stain on the surface of printed matter, such as securities.

A conventional degree-of-stain-on-printed-matter examining apparatus examines the degree of stain on printed matter as follows. The apparatus causes image input means, such as a television camera or a line sensor, to pick up the surface image or transmitted image on one side or both sides of printed matter and input the image data, senses the leading edge of the printed matter from the inputted image data, takes in the image data from the whole surface of the printed matter, starting from the sensed leading edge, and compares the taken-in image data with the preset reference data, thereby determining the degree of stain on the printed matter.

One known method of calculating the degree of stain in such a degree-of-stain-on-printed-matter examining apparatus is to examine the degree of stain only in a specific area, such as an unprintable area, on the whole surface of the printed matter.

There has been no degree-of-stain-on-printed-matter examining apparatus for examining the degree of stain on the areas other than the unprintable area, that is, the degree of stain on the printed area. Accordingly, the conventional degree-of-stain-on-printed-matter examining apparatus has the problem of failing to examine the degree of stain which persons feel from the whole surface of printed matter.

BRIEF SUMMARY OF THE INVENTION

The object of the present invention is to provide a degree-of-stain-on-printed-matter examining apparatus capable of examining the degree of stain on printed matter with as high accuracy as that of human senses.

In order to achieve the above object, according to one aspect of the present invention, there is provided an apparatus for examining the degree of stain on printed matter, comprising: image input means for inputting images including the image of printed matter to be examined and supplying image data on the printed matter; area information storage means for storing positional information on at least two target areas on a standard image corresponding to the image of the printed matter, the area of each of the target areas, their standard average densities, and the degree of dispersion in their density distribution; average density computing means for calculating the average density for each target area in the image data supplied from the image input means by using the positional information on each target area and the area of each target area supplied from the area information storage means; density difference measuring means for measuring the density difference between the average density for each target area calculated by the average density computing means and the standard average density for each target area supplied from the area information storage means; density difference normalizing means for normalizing the density difference for each target area by using the density difference for each target area measured at the density difference measuring means and the degree of dispersion in the density distribution for each target area supplied from the area information storage means; and summing means for summing the normalized density difference for each of the target areas supplied from the density difference normalizing means and thereby judging the degree of stain on the printed matter to be examined.

The apparatus of the invention further comprises: visual characteristic coefficient computing means for calculating a coefficient agreeing with human visual characteristics for the standard average density for each target area supplied from the area information storage means; and weighting means for calculating a degree-of-stain decision value for each target area by multiplying the normalized density difference for each target area supplied from the density difference normalizing means by the area of each target area supplied from the area information storage means, and further by the visual characteristic normalized coefficient supplied from the visual characteristic coefficient computing means, wherein the summing means includes addition means for adding the degree-of-stain decision value for each of the target areas supplied from the weighting means and judging means for judging the degree of stain on the printed matter by comparing the degree-of-stain decision value added by the addition means with a specific threshold value for the degree of stain.

The visual characteristic coefficient computing means determines the reflectivity corresponding to the standard average density for each target area supplied from the area information storage means and calculates the visual characteristic normalized coefficient on the basis of the ratio of the individual reflectivities.

The apparatus of the invention further comprises learning means which includes: storage means for receiving images of the printed matter as an object of learning from the image input means and storing the images of the printed matter; average image creating means for creating an average density value image on the basis of the images stored in the storage means; labeling means for putting the same label on the pixels included in the same density range on the average density value image supplied from the average image creating means; area extracting means for combining areas in the same density range where more than a specific number of pixels are consecutive on the images subjected to the labeling process by the labeling means, thereby extracting a target area on the printed matter, and supplying the number of the target areas and their positional information; area computing means for computing the area of each target area calculated by the area extracting means; and statistical value computing means for creating a density histogram for the average value image supplied from the average image creating means and calculating the average density and standard deviation for each target area, wherein the area information storage section stores the number of target areas and positional information supplied from the area extracting means, the area of each target area supplied from the area-by-area area computing means, and the average density and average standard deviation for each target area supplied from the statistical value computing means.

With the present invention, the degree of stain on the whole surface of printed matter (the degree of dirtiness persons feel from the whole surface of the printed matter) is judged by using the degree of stain on at least two target areas on the printed matter, the area of each target area, and a coefficient expressing how conspicuous stains are to human senses at the average density of each target area on the printed matter. At a result, the degree of stain on printed matter can be examined with as high accuracy as human senses.

Furthermore, pieces of printed matter can be arranged in the order of human senses, for example, in the order in which the cleanest one comes first and the dirtiest one comes last. Moreover, the degree of stain on one side and that on the other side can be evaluated and, on the basis of the evaluation, stains clustered only on one side can be examined.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Hereinafter, referring to the accompanying drawings, embodiments of the present invention will be explained.

Explanation of a first embodiment of the present invention will be given.

Figure 1:
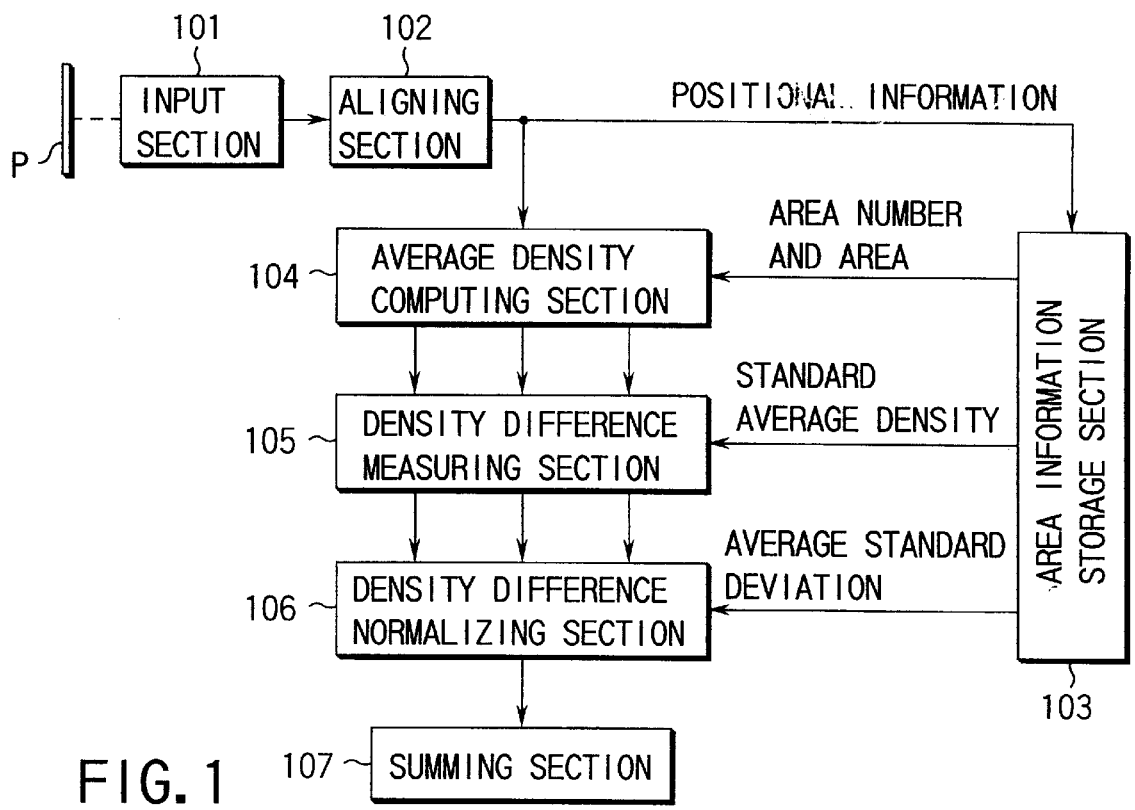
FIG. 1 is a schematic block diagram of an apparatus for examining the degree of stain on printed matter according to a first embodiment of the present invention.

FIG. 1 schematically shows the configuration of an apparatus for examining the degree of stain on printed matter according to a first embodiment of the present invention. An image;input section 101 includes a photoelectric conversion section, such as a television camera or a line sensor, that reads image data on the whole surface by optically scanning the whole surface of one side of printed matter P to be examined and photoelectrically converting the sensed signal and supplies the output in the form of a digital signal.

The image data on the printed matter P supplied from the image input section 101 is sent to an aligning section 102. The aligning section 102 aligns the position of the image data by moving (converting) the position of the printed-matter image in the image data to a specific position and sends the aligned image data and the positional information (pixel address) to each of an average density computing section 104 and an area information storage section 103.

Using the image data aligned by the aligning section 102 and the area numbers and areas of at least two target areas on the printed matter P obtained from an area information storage section 103, the average density computing section 104 calculates the average density of each target area and sends the calculation results to a density difference measuring section 105. A target area is a specific area on the printed matter P whose degree-of-stain is to be measured. For example, it is an area in which a characteristic image has been printed.

Using the average density of each target area calculated at the average density computing section 104 and the standard average density of each target area obtained from the area information storage area 103, the density difference measuring section 105 calculates the density difference between average densities for each target area and sends the calculation results to a density difference normalizing section 106.

Using the density difference calculated at the density difference measuring section 105 and the average standard deviation of each target area obtained from the area information storage section 103, the density difference normalizing section 106 normalizes the density difference for each target area and sends the normalized density difference values to a summing section 107.

The summing section 107 sums up the normalized density difference values of the individual target areas obtained from the density difference normalizing section 106, judges the degree of stain on the printed matter P, and outputs the result of the judgment as the result of the examination.

Hereinafter, the operation of the first embodiment will be explained in detail.

The image input section 101 picks up the whole surface image of the printed matter P in the form of an analog signal and converts it into a digital signal. Explanation will be given, taking a case where the image data is read while the printed matter P is being transferred. The image data may be read by fixing the printed matter P and causing the photoelectric conversion section in the image input section 101 to move over and scan the image data.

Figure 2:
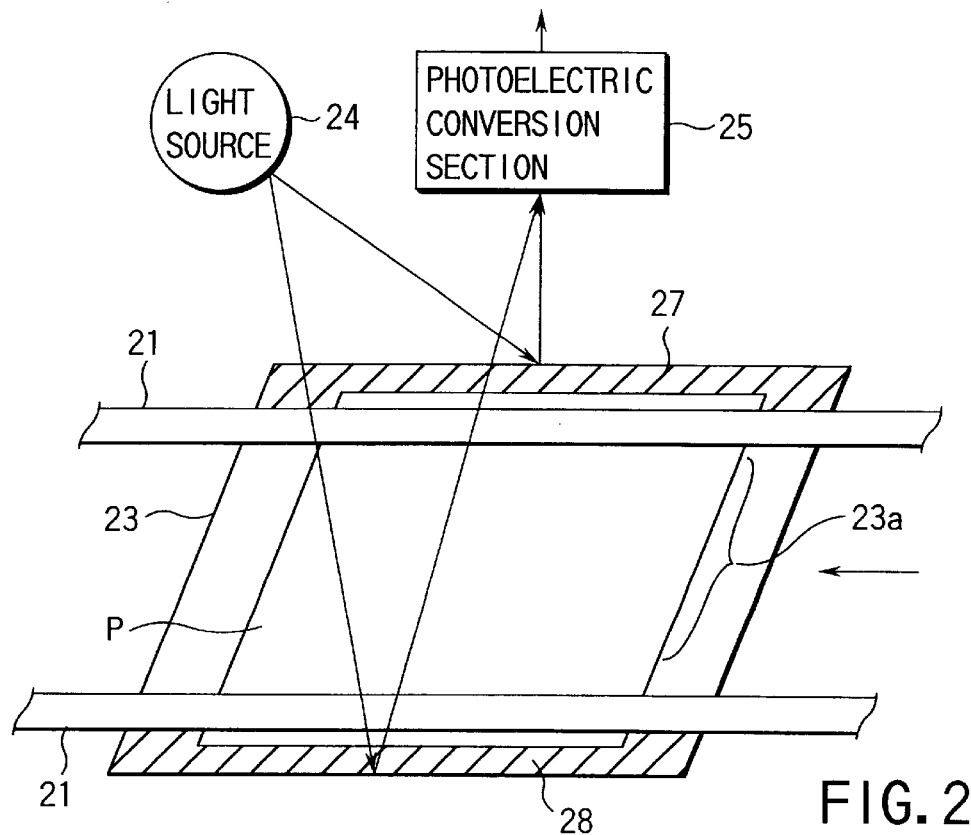
FIG. 2 is a schematic diagram of the image input section.
Figure 3:
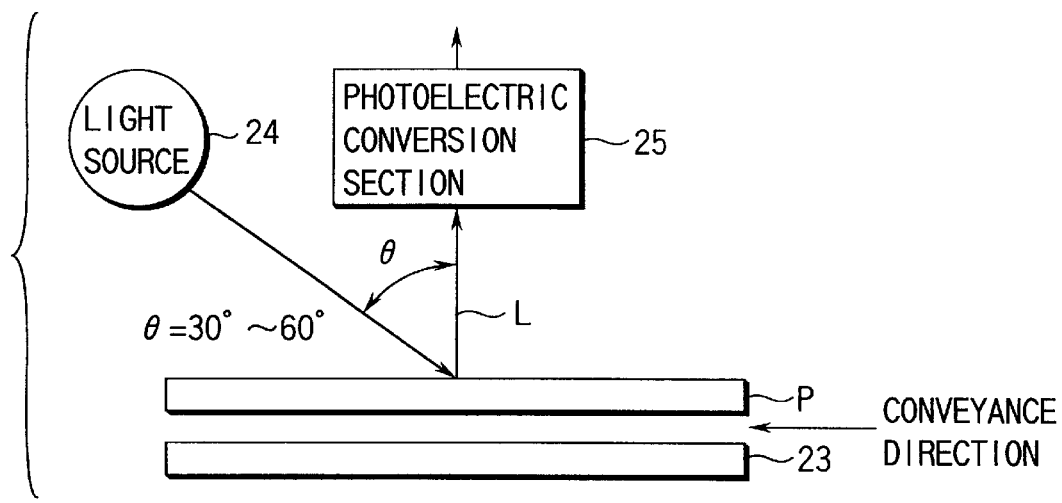
FIG. 3 is a side view showing the location of the main part of the image input section.

FIGS. 2 and 3 show examples of the configuration of the image input section 101. Specifically, the printed matter P, which is pinched by two transfer belt 21, 22, is transferred in the direction of the arrow. Below the transfer belts 21, 22, a reference plate 23 is secured. The printed matter P is transferred over almost the center of the reference plate 23.

Above the transfer belts 21, 22 facing the reference plate 23, a light source 24 that illuminates the reference plate 23 and the printed matter P transferred, and a photoelectric conversion section 25 that receives the reflected light from the reference plate 23 and the printed matter P transferred and converts it into an electric signal are provided. The reference plate 23 may be made of transparent glass and the light source 24 and photoelectric conversion section 25 be provided below the reference plate 23. In that case, the photoelectric conversion section 25 receives the transmitted reflected light, which prevents the image of the printed matter P from being obstructed by the belts 21, 22.

The reflected light (or the transmitted light) from the printed matter P strikes the light-receiving surface of the photoelectric conversion section 25 vertically. In this case, the light source 24 is provided so as to prevent the angle θ from a perpendicular line L extending between the printed matter P and the photoelectric conversion section 25 from being nearly 0° or 90° as shown in FIG. 3. For example, it is so provided that the angle θ lies in the range of 30° to 60°. While in FIG. 3, the printed matter P is illuminated from the front in the transfer direction, it may be illuminated from the back.

Figure 4:
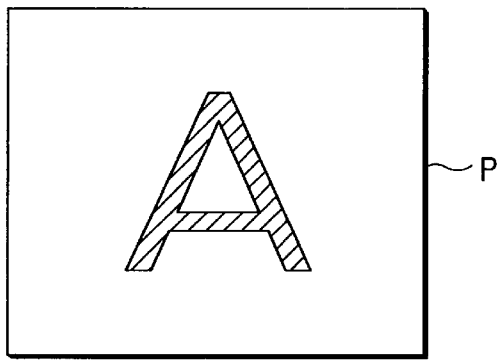
FIG. 4 is a plan view of an example of printed matter.
Figure 5:
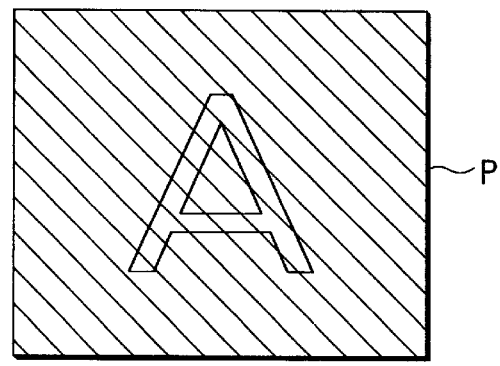
FIG. 5 is a representation to help explain an area on the printed matter to be extracted.

A suitable reference plate 23 will be explained concretely using the printed matter P in FIG. 4 as an example. It is assumed that the printed matter P of FIG. 4 is a white sheet of paper on which the letter A is printed in its center with an ink of a specific color other than white and that the area of the printed matter P is the shaded area shown in FIG. 5 (where the belts 21, 22 are omitted).

A high-reflectivity material is used as a substrate 23a (see FIG. 2) corresponding to the background of the printed matter P including a target area from which the amount of feature is to be extracted. The high-reflectivity material has to be less liable to become dirty in order that, when printed matter P on whose front and back some letters have been printed is transferred, the ink is prevented from adhering to the reference plate 23 and the reflectivity is kept from decreasing. Namely, a high-reflectivity material less liable to become dirty is provided at the back of the printed patter P transferred. Examples of such material include opal and ceramic.

The background areas 27, 28 (see FIG. 2) at both ends of the printed matter P in the direction perpendicular to the transfer direction of the printed matter P are given a color having a high contrast with the sheet of the printed material P. For example, when a white sheet of paper is used as the printed matter P as shown in FIG. 4, the background areas 27, 28 are made black. The reason is that use of black makes it easy to determine the position of the printed matter P in analyzing the image data.

The aligning section 102 extracts, for example, the top left end position of the printed matter P from the image data on the whole surface of the printed matter P inputted from the image input section 101. Hereinafter, a method of extracting the position will be explained in detail.

The aligning section 102 first extracts the area of the printed matter P in the read-out image data. Since the printed matter P is being transferred, the position may not be extracted correctly under the influence of uneven transfer.

In the first embodiment, the printed matter P is extracted on the basis of the density information. It is clear that setting the threshold in density values facilitates the extraction of the boundary between the printed matter and the background because the reference plate 23 has been set so that the contrast between the color of the sheet of the printed matter P and the background color may be sufficiently high.

Figure 6:
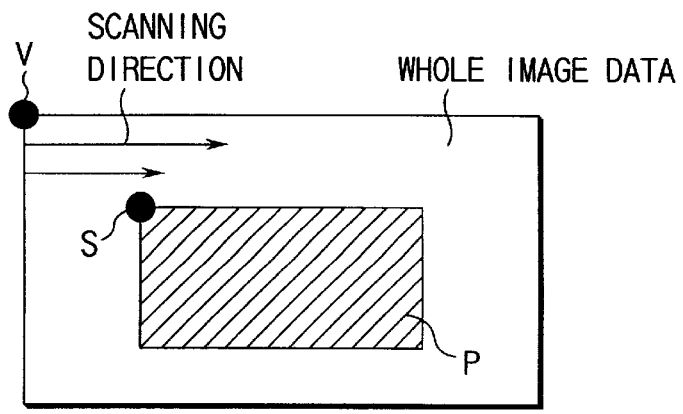
FIG. 6 is a representation to help explain a method of extracting the top left end of the printed matter.
Figure 7A:
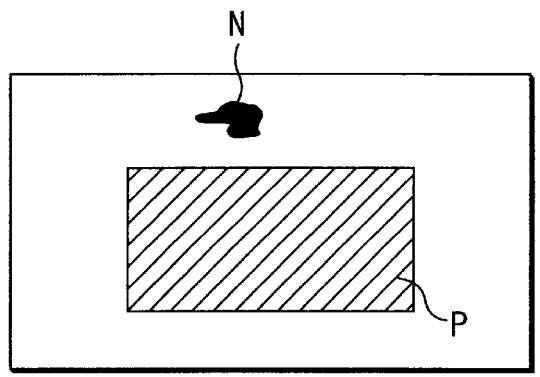
FIGS. 7A and 7B are a representation of an image data item interfered with noise and that of an image data item when the printed matter has tilted, respectively.

As shown in FIG. 6, the aligning section 102 takes in the density data on each pixel from the top left end V of the image data to the right and calculates the position S at which the density changes. At this time, when there is some dust (noise) N on the background of the printed matter P, or the reference plate 23 as shown in FIG. 7A, there is a possibility that the dust N will be extracted, being mistaken for the top left end of the printed matter P. Thus, a noise removing process is carried out. When the printed matter P has tilted as show in FIG. 7B, the process (rotational process) of computing and correcting the inclination is also carried out.

Figure 7B:
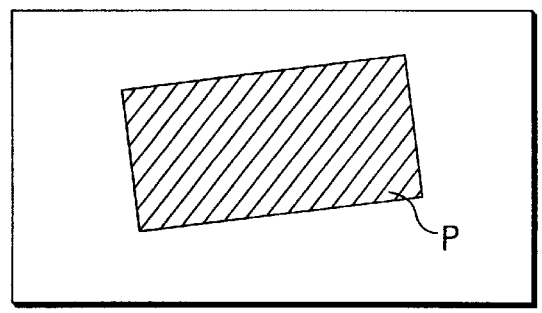
Figure 8:
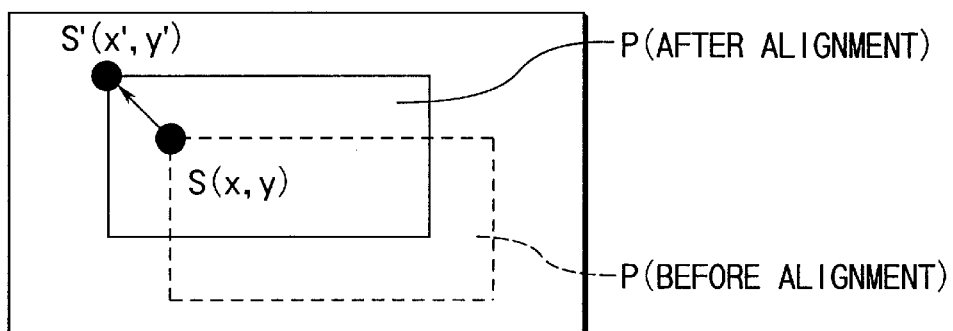
FIG. 8 is a representation to help explain a method of aligning the image data item.

As shown in FIG. 8, the calculated position S (x, y) is converted into a specific position S' (x', y') on the whole image data. Namely, the image data on the printed matter P is moved parallel to the specific position on the whole image data. When the printed matter P has tilted as shown in FIG. 7B, the inclination is corrected and then the image of the printed matter is moved parallel.

In the area information storage section 103, pieces of information including the area, standard density value, and average standard deviation of each of at least two target areas on a standard image (or a typical image) of the printed matter P have been stored.

Figure 10:
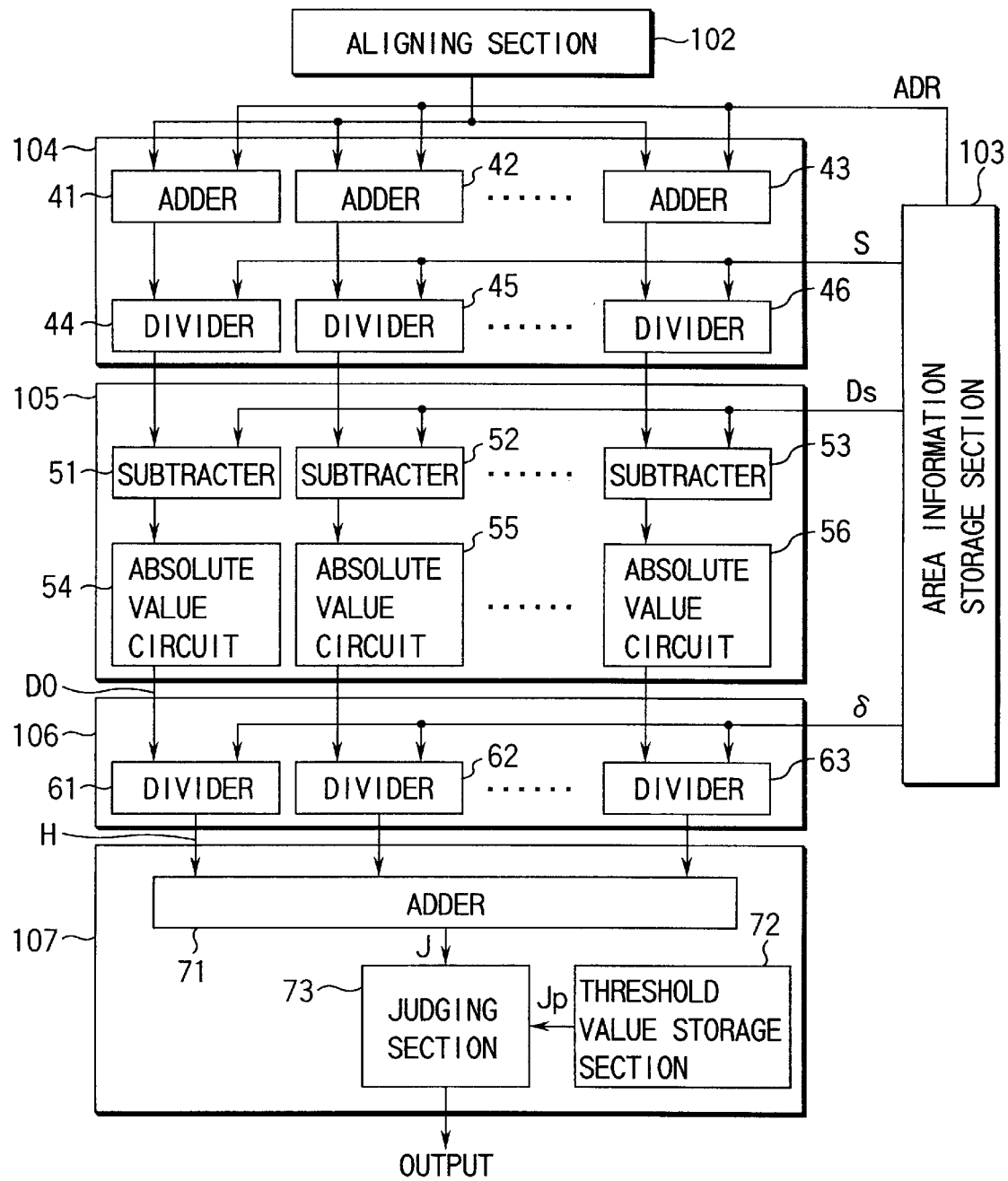
FIG. 10 is a detailed block diagram of an average density computing section, a density difference measuring section, a density difference normalizing section, and a summing section.

FIG. 10 shows the configuration of the average density computing section 104, density difference measuring section 105, density difference normalizing section 106, and summing section 107.

The average density computing section 104 receives the image data from the aligning section 102 and the address ADR and area S of a target area from the area information storage section and calculates the average density value for each target area on the printed matter P. In the average density computing section 104, adders 41, 42, . . . , 43 and dividers 44, 45, . . . , 46 are provided in such a manner that they correspond to the individual target areas, one adder and one divider for one target area. Specifically, using the image data on the printed matter P aligned by the aligning section 102, the adders 41, 42, . . . , 43 add the density values for each target area on the basis of the relative address of each target area on the printed matter P obtained from the area information storage section 103. For example, it is assumed that the pixel corresponding to the coordinates (x, y) of point t in the image data is a pixel in the target area [a]. The density integral value for each target area on the printed matter P is calculated by determining the density values of the pixels with the coordinates in the target area [a] and adding up the density values.

Next, the dividers 44, 45, . . . , 46 divide the calculated density integral values by the area S of each target area obtained from the area information storage area 103. This enables the average density value for each target area on the printed matter P to be calculated.

Using the average density for each target area on the printed matter P calculated at the average density computing section 104 and the standard average density $D_S$ for each target area obtained from the area information storage section 103, subtracters 51, 52, . . . , 53 in the density difference computing section 105 do subtraction for each target area on the printed matter to find the density difference. Specifically, the subtracters 51, 52, . . . , 53 subtract the average density $D_{AV}$ from the standard average density $D_S$. Then, absolute value circuits 54, 55, . . . , 56 calculate the absolute value $D_D$ of the density difference as follows:

$$D_D = |D_S - D_{AV}| \quad (1)$$

Using the absolute value $D_D$ of the density difference for each target area on the printed matter P calculated at the density difference computing section 105 and the average standard deviation σ of each target area obtained from the area information storage section 103, the density difference normalizing section 106 causes dividers 61, 62, . . . , 63 to do division. Specifically, the density difference normalizing section 106 normalizes the density difference for each target area by dividing the absolute value $D_D$ of the density difference by the average deviation σ and produces the normalized density difference (the degree of stain) H as follows:

$$H = \frac{|D_S - D_{AV}|}{\sigma} \quad (2)$$

The summing section 107 causes an adder 71 to add up the normalized density difference (the degree of stain) H for each target area on the printed matter P determined by the density difference normalizing section 106 and thereby sums up the degree of stain for each target area on the printed matter P.

Furthermore, the summing section 107 causes a threshold value storage section 72 and a judging section 73 to determine the degree of stain on the printed matter P on the basis of the degree of stain calculated. Specifically, suppose the calculated degree of stain is J and the judgment threshold value in examination is Jp (previously stored in the threshold value storage section 72). Under this supposition, the judging section 73 makes a judgment as follows:

If J≧Jp, then it judges that the printed matter P is dirty.

If J<Jp, then it judges that the printed matter. P is clean.

In this case, the judgment threshold value Jp can be set variously. Consequently, the result of the examination, for example, the rate of stain, can be set variously.

Hereinafter, a second embodiment of the present invention will be explained.

Figure 11:
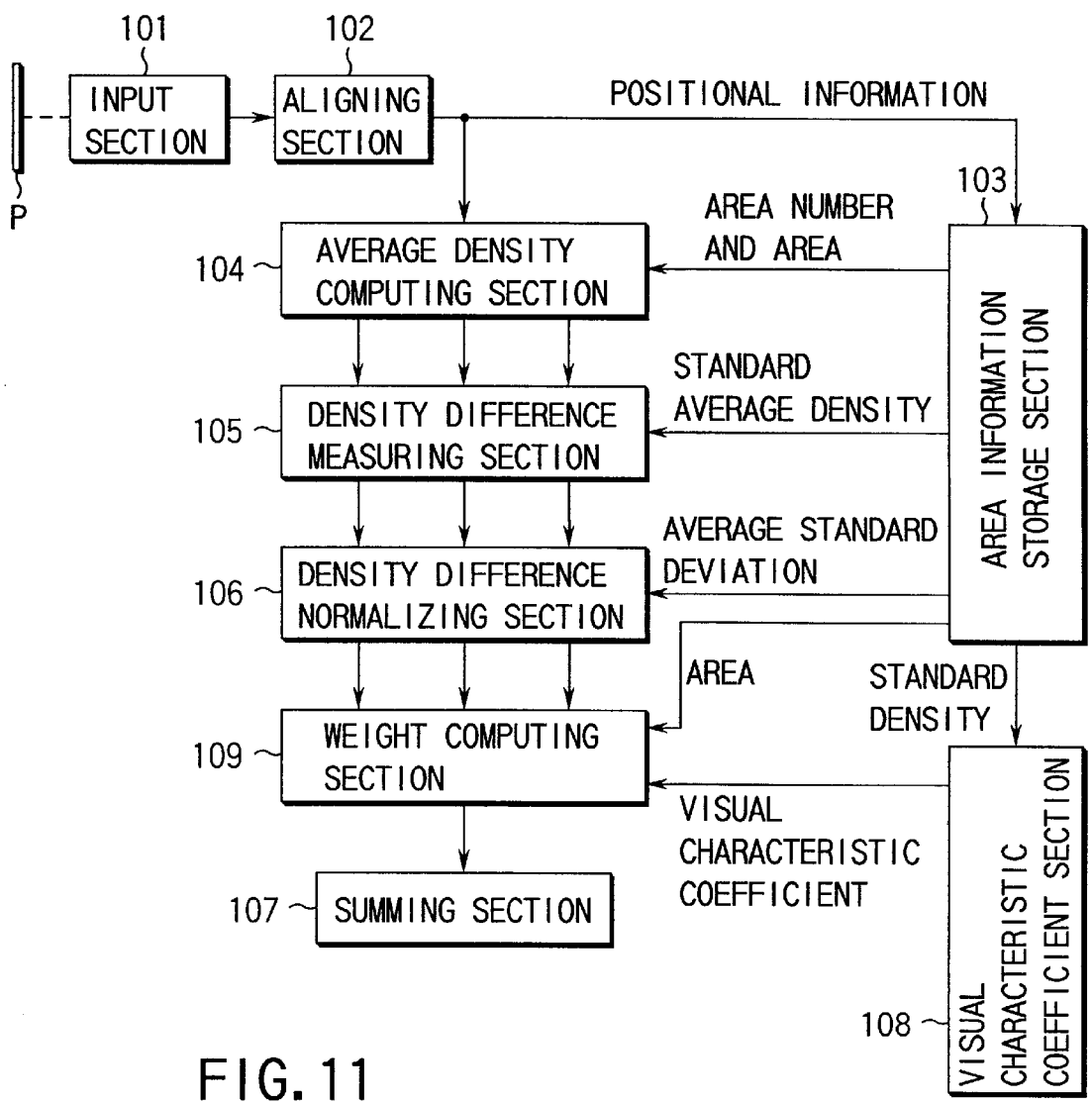
FIG. 11 is a schematic block diagram of an apparatus for examining the degree of stain on printed matter according to a second embodiment of the present invention.

FIG. 11 schematically shows the configuration of an apparatus for examining the degree of stain on printed matter according to a second embodiment of the present invention. The second embodiment has the same configuration as that of the first embodiment except that a visual characteristic coefficient section 108 and a weight computing section 109 are added to the first embodiment. The same parts as those in the first embodiment are indicated by the same reference symbols. Explanation of some of the component parts will be omitted or simplified. What differs from the first embodiment will be explained in detail.

The visual characteristic coefficient section 108 calculates a coefficient agreeing with a human visual characteristic for the standard average density of each target area on the printed matter P obtained from the area information storage section 103. Before explanation of a method of computing the coefficient, the human visual characteristic will be explained. Even when stains with the same density are present, the degree of stain persons feel differs, depending on the place where the stains are present, for example, depending on whether the stains are on a light-colored print area or on a dark-colored print area. This is known as the human visual characteristic. It is the visual characteristic coefficient section 108 that calculates a coefficient (visual characteristic coefficient) corresponding to the visual characteristic.

Figure 12:
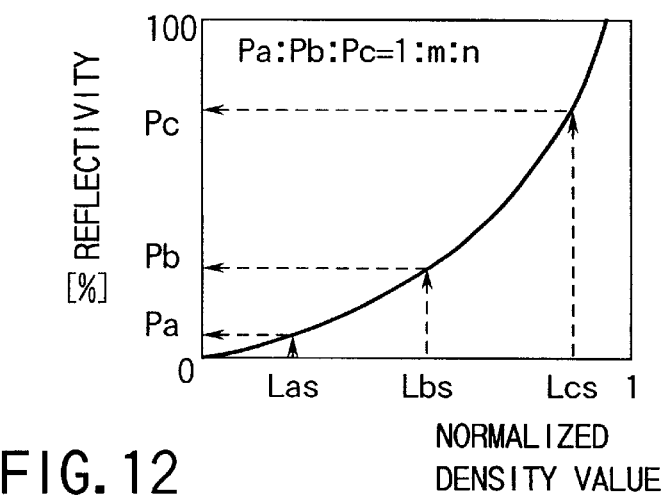
FIG. 12 is a visual characteristic of a human being.

A coefficient for each target area is calculated by causing the density average value for each target area on the printed matter P to correspond to the human visual characteristic. For example, if the density average value of label ⌈a⌋ (target area 1) is ⌈La⌋, the density average value of label ⌈b⌋ is ⌈Lb⌋, and the density average value of label ⌈c⌋ is ⌈Lc⌋ in FIG. 16, the coefficients are calculated using the human visual characteristic shown in FIG. 12. FIG. 12 is a characteristic diagram showing that even when stains have the same density, how conspicuous the stains are differs, depending on the density of the background image.

In FIG. 12, Las to Lcs are the values obtained by normalizing the density average values La to Lc on the basis of a dynamic range (0 to 255). (That is, Las to Lcs are the values obtained by dividing La to Lc by 255). The normalized density value is not linearly proportional to the reflectivity. Even when stains have the same density, a stain on an area (La) with a large normalized density value is more conspicuous than that on an area (Lc) with a small normalized density value.

Reflectivities Pa to Pc for the individual labels are found. Then, the ratio of the reflectivities is calculated to determine a visual characteristic normalized coefficient (l, m, n) as follows:

$$Pa:Pb:Pc = 1:m:n \quad (3)$$

The weight computing section 109 performs weight calculations using the normalized density difference (degree of deviation) H for each target area on the printed matter P calculated at the density difference normalizing section 106, the visual characteristic normalized coefficient K for each target area calculated at the visual characteristic coefficient section 108, and the area S of each target area supplied from the area information storage section 103.

Specifically, the weight computing section 109 calculates the degree-of-stain decision value D for each target area by multiplying the degree of deviation H for each target area expressed by equation (2), the area S of each target area, and the visual characteristic normalized coefficient K (for example, l, m, n).

For example, if the degree of deviation of a target area e is He, its area is Se, and its visual characteristic normalized coefficient is Ke, the degree-of-stain decision value De is expressed as follows:

$$De = He \times Se \times Ke \quad (4)$$

The summing section 107 adds all the degree-of-stain decision values for the individual target areas on the printed matter P calculated at the weight computing section 109 and sums up the degree of stain for all the target areas on the printed matter P as follows:

$$J = \Sigma De \quad (5)$$

where e is in the range of 1 to n (n is the number of target areas).

Furthermore, the summing section 107 determines the degree of stain on the printed matter P on the basis of the calculated degree of stain. Specifically, suppose the calculated degree of stain is J and the judgment threshold value in examination is Jp. Under this supposition, the summing section 107 makes a judgment as follows:

If J≧Jp, then it judges that the printed matter P is dirty.

If J<Jp, then it judges that the printed matter P is clean.

In this case, the judgment threshold value Jp can be set variously. Consequently, the result of the examination, for example, the rate of stain, can be set variously.

Hereinafter, a third embodiment of the present invention will be explained.

Figure 13:
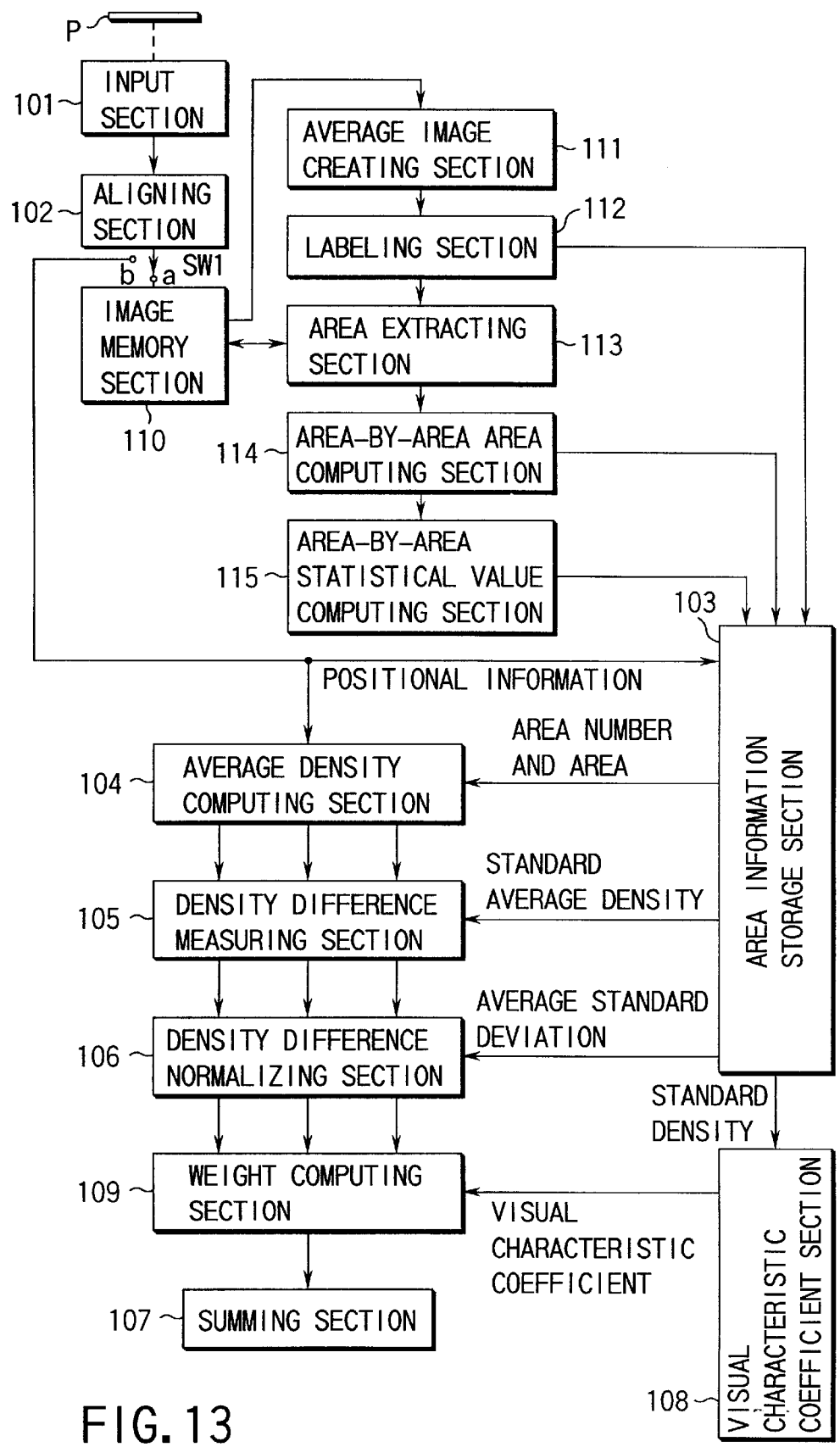
FIG. 13 is a schematic block diagram of an apparatus for examining the degree of stain on printed matter according to a third embodiment of the present invention.

FIG. 13 schematically shows the configuration of an apparatus for examining the degree of stain on printed matter according to a third embodiment of the present invention. The third embodiment is obtained by adding learning means for creating storage information in the area information storage section 103 by learning to the second embodiment. The remaining degree-of-stain examining part has the same configuration as that of the second embodiment in FIG. 11. The same parts as those in the second embodiment are indicated by the same reference symbols. Explanation of some of the component parts will be omitted or simplified. What differs from the second embodiment will be explained in detail.

In learning, N sheets of the printed matter P are used. The image input section 101 reads the image data on the whole surface on one side of each sheet of the printed matter P and sends the read-out data to the aligning section 102. The aligning section 102 aligns the position of the image data inputted from the, image input section 101 as described earlier. An SW 1 is connected to contact a in then learning mode in the third embodiment and to contact b in the normal degree-of-stain examining mode. The image data aligned by the aligning section 102 is stored in an image memory section 110.

An average image creating section 111 creates an average density value image (explained later) on the basis of the N image data items stored in the image memory section 110 and sends the created average density value image to a labeling section 112.

The labeling section 112 carries out a labeling process of putting the same label on the pixels included in the same density range and sends the image data items subjected to the labeling process to an area extracting section 113.

Using the image subjected to the labeling process, the area extracting section 113 judges a target area on the printed matter P by combining the same density ranges where more than a specific number of pixels are consecutive, and sends the judged target area to an area-by-area area-computing section 114.

The area-by-area area-computing section 114 calculates the area of each target area computed at the area extracting section 113 and sends the result of the computation to an area-by-area statistical value computing section 115. The area-by-area statistical value computing section 115 calculates the density distribution (histogram) of the average value images in each target area and calculates the average density and dispersion in the distribution, for example, the standard deviation.

The area information storage section 103 stores the number of target areas and the area, average density, and average standard deviation of each target area.

Hereinafter, the operation of the third embodiment will be explained in detail.

The image memory section 110 stores the image data on the printed matter P aligned at the aligning section 102. The image memory section 110 repeats the operation, for example, N times for N sheets of the printed matter P. As a result, the image memory section 110 stores the image data for the N sheets of the printed matter P aligned.

The average image creating section 111 creates N average density value images from the image data for the N sheets of the printed matter stored in the image memory section 110. A method of creating the images is to add the density values of N pixels existing in the corresponding positions on the individual N images, divide the addition result by N, and thereby determining the pixel density at the position. This operation is carried out for all the pixels to create the average density value image for the N images (hereinafter, referred to as the N-sheet average image).

Figure 14:
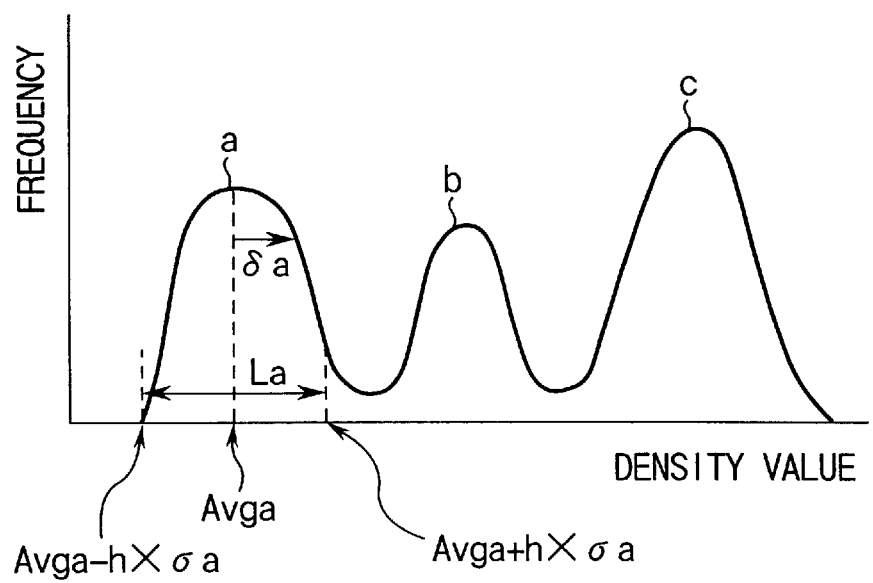
FIG. 14 is a density histogram of the whole surface of printed matter.

On the basis of the N-sheet average image created by the average image creating section 111, the labeling section 112 puts the same label on the pixels included in the same density range. Specifically, a density histogram is calculated from the N average images of the printed matter P. In the calculated density histogram, for example, when plural mountains a to c are present as shown in FIG. 14, the density average value and standard deviation of each of mountains a to c are calculated. For example, if the density average value of mountain a in FIG. 14 is Avga and its standard deviation is σa, a pixel with a density lying in the range La is defined as a pixel belonging to label a, wherein La is expressed as:

$$Avga-h\times\sigma a \geq La \geq Avga+h\times\sigma a$$

where h is an integer.

Similarly, concerning mountain b and mountain c in FIG. 14, labels are determined as follows:

$$Avgb-h\times\sigma b \geq Lb \geq Avgb+h\times\sigma b.$$

$$Avgc-h\times\sigma c \geq Lc \geq Avgc+h\times\sigma c.$$

Consequently, three labels are used.

Figure 15:
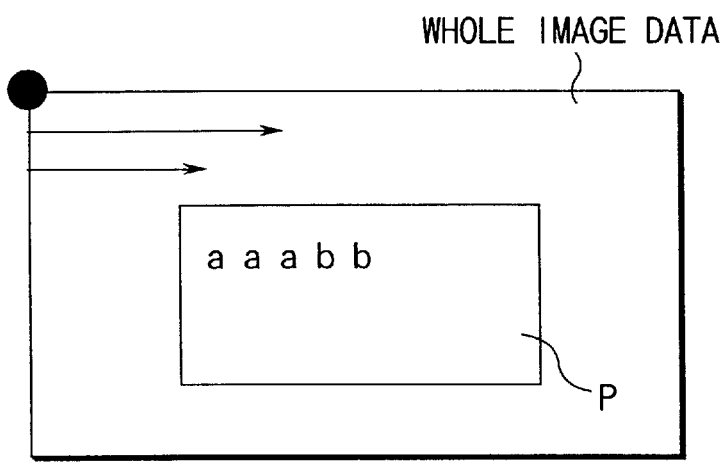
FIG. 15 is a representation to explain a labeling process.

Then, the labeling section 12 scans the image data on the printed matter P as shown in FIG. 15 and judges which one of the calculated labels La to Lc the pixel density value exists in. The labeling section 12 carries out the labeling process by putting the same label on the pixels contained in the same density range in such a manner that, for example, it puts label [a] on the pixels contained in the density range [La], label [b] on the pixels contained in the density range [Lb], and label [c] on the pixels contained in the density range [Lc].

The pixels belonging to the density ranges excluding the density ranges La, Lb, and Lc are not subjected to the labeling process and are ignored in the subsequent processes.

Figure 16:
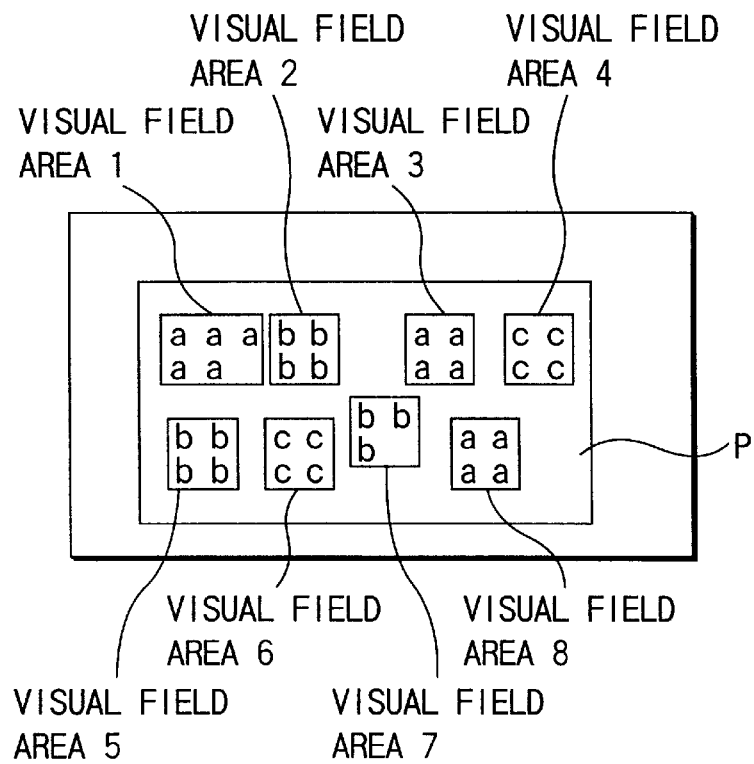
FIG. 16 shows an example of the result of the labeling process.

The area extracting section 113 combines the same labels where more than a specific number of pixels are consecutive, in the labeling images obtained from the labeling section 112. For example, suppose N average images of the printed matter P are labeled as shown in FIG. 16. The area extracting section 113 judges that the same label where more than a specific number of pixels are consecutive is one combined area and sets it as one target area. Consequently, the number of labels does not necessarily coincide with the number of set target areas. In FIG. 16, although the number of labels [a], [b], [c] is three, the number of set target areas is eight.

The area-by-area area-computing section 114 calculates the area of each target area on the printed matter P extracted by the area extracting section 113. The area is easily calculated by adding the number of pixels in each target area.

Figure 17:
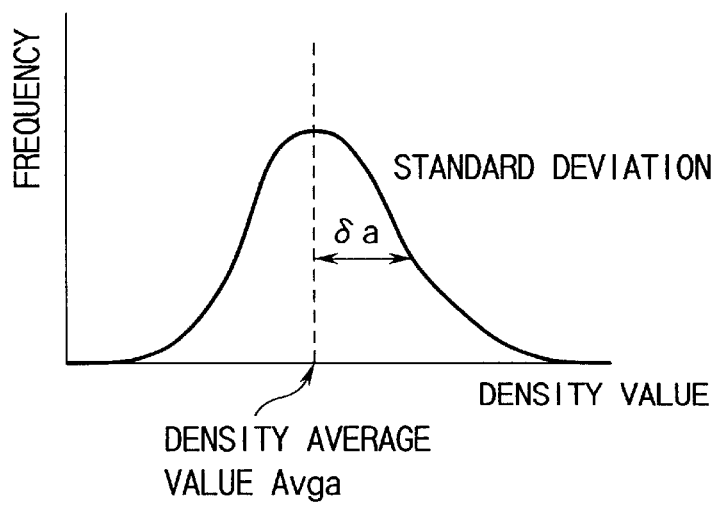
FIG. 17 is a density histogram of a target area.

The area-by-area statistical value computing section 115 calculates the density distribution in the N average images for each target area and computes the density average value and dispersion in the distribution, for example, the standard deviation. A method of calculating the values is to compute a histogram for the N average images for each target area. For example, suppose the histogram of target area 1 for the N average images shown in FIG. 16 is calculated as shown in FIG. 17. Using the histogram, the area-by-area statistical value computing section 115 calculates the density average value and further the standard deviation.

The area information storage section 103 stores the positional information on each target area obtained at the labeling section 112, the area of each target area determined at the area-by-area area computing section 114, and the density average value for each target area and standard deviation of density value for each target area calculated at the area-by-area statistical value computing section 115.

While calculations have been made using N average images for each target area on the printed matter P, the density integral value of each corresponding pixel of the N images may be calculated, a histogram for the density integral values be made, and the average value and standard deviation be calculated using the histogram.

Figure 18:
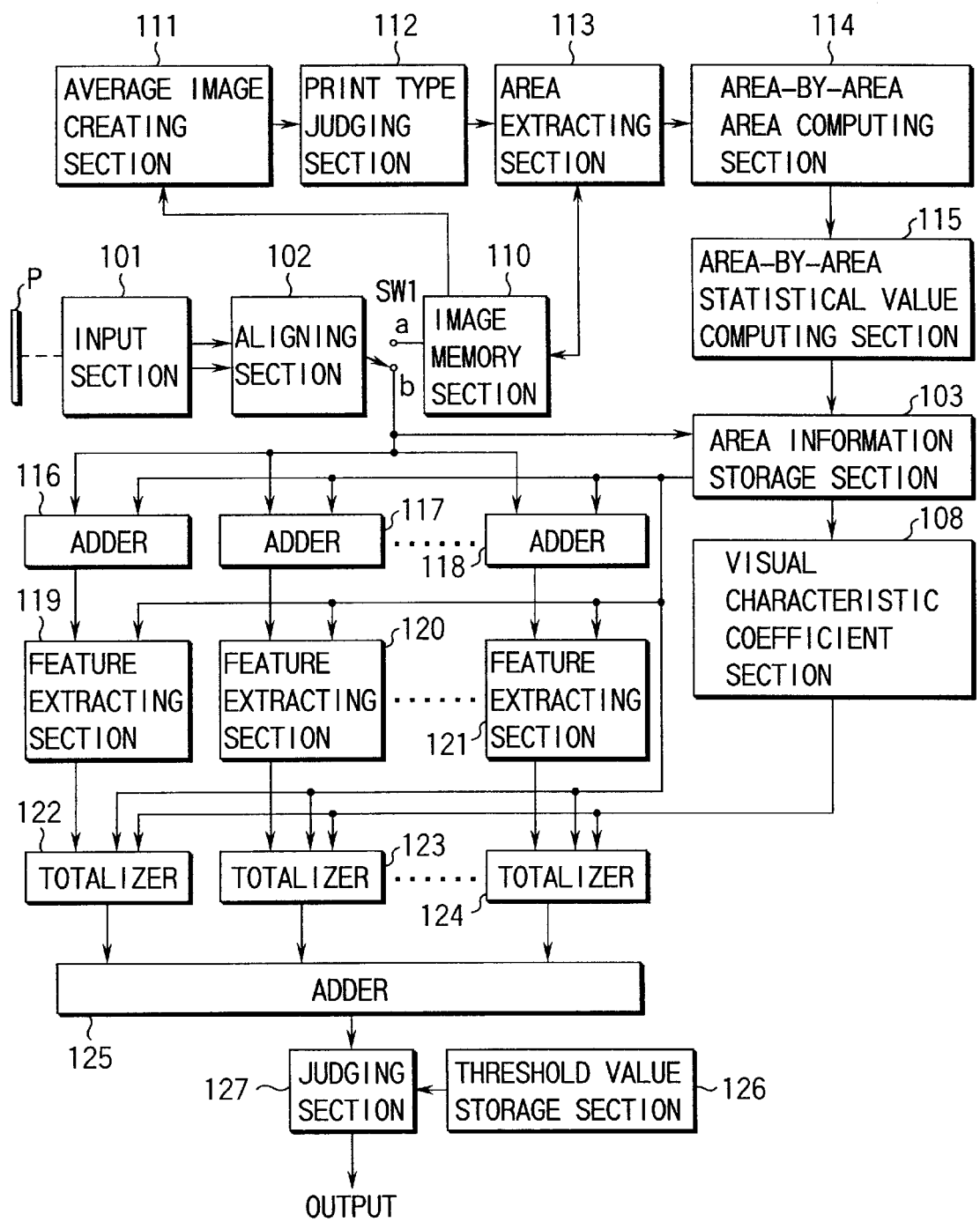
FIG. 18 is a schematic block diagram of the apparatus for examining the degree of stain on printed matter of FIG. 13.

FIG. 18 shows the configuration of the degree-of-stain examining section (103 to 109) in the third embodiment (see FIG. 13).

In the third embodiment, the SW1 is connected to contact b. Using the image data on the printed matter P aligned by the aligning section 102 and the positional information on each target area on the printed matter P obtained from the area information storage section 103, adders 116, 117, ..., 118 add the pixel density values for each target area.

Using the area of each target area, the density average value, and dispersion in the density distribution (standard deviation) obtained from the area information storage section 103, feature extracting sections 119, 120, ..., 121 calculate the amount of feature in the degree of stain (e.g., the deviation of density average value) for each target area.

Using the amount of feature in the degree of stain for each target area extracted by the feature extracting sections 119, 120, ..., 121, the area of each target area obtained from the area information storage section 103, and the visual characteristic normalized coefficient for each target area calculated by the visual characteristic coefficient section 108, totalizers 122, 123, ..., 124 calculate a degree-of-stain decision value for each target area.

An adder 125 calculates a degree-of-stain decision value for the printed matter P by adding the degree-of-stain decision values for the individual target areas calculated by the totalizers 122, 123, ..., 124. Using the degree-of-stain decision value calculated at the adder 125 and the judgment threshold value obtained from the threshold storage section 126, a judging section 127 judges the degree of stain on the printed matter P.

Hereinafter, the operation of the third embodiment will be explained in detail.

The image input section 101 supplies the digital image data on the printed matter P. The aligning section 102 subjects the image data to the aligning process and tells the area information storage section 103 information on each target area on the printed matter P, for example, a relative address for each target area.

Figure 9:
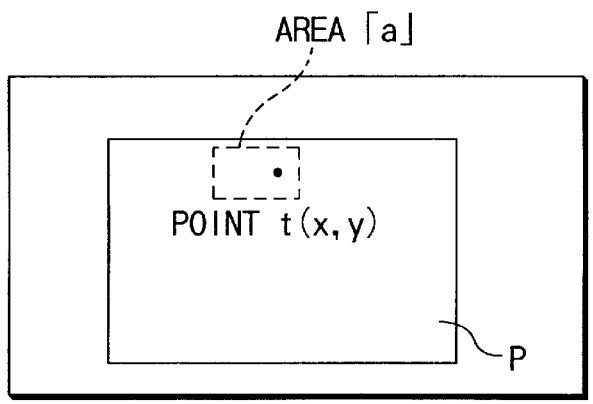
FIG. 9 is a representation to help explain area information on the printed matter.

Using the image data on the printed matter P aligned by the aligning section 102, the adders 116, 117, ..., 118 add the density values for each target value on the basis of information on the position of each target area on the printed matter P obtained from the area information storage section 103. For example, if the pixel corresponding to the coordinates (x, y) of point t in the image data is included in the target area ⌈a⌋ as shown in FIG. 9, the adder 116 adds the density values of such a pixel. Namely, the adders 116, 117, ..., 118 calculate the density integral value for each target area on the printed matter P.

Figure 19:
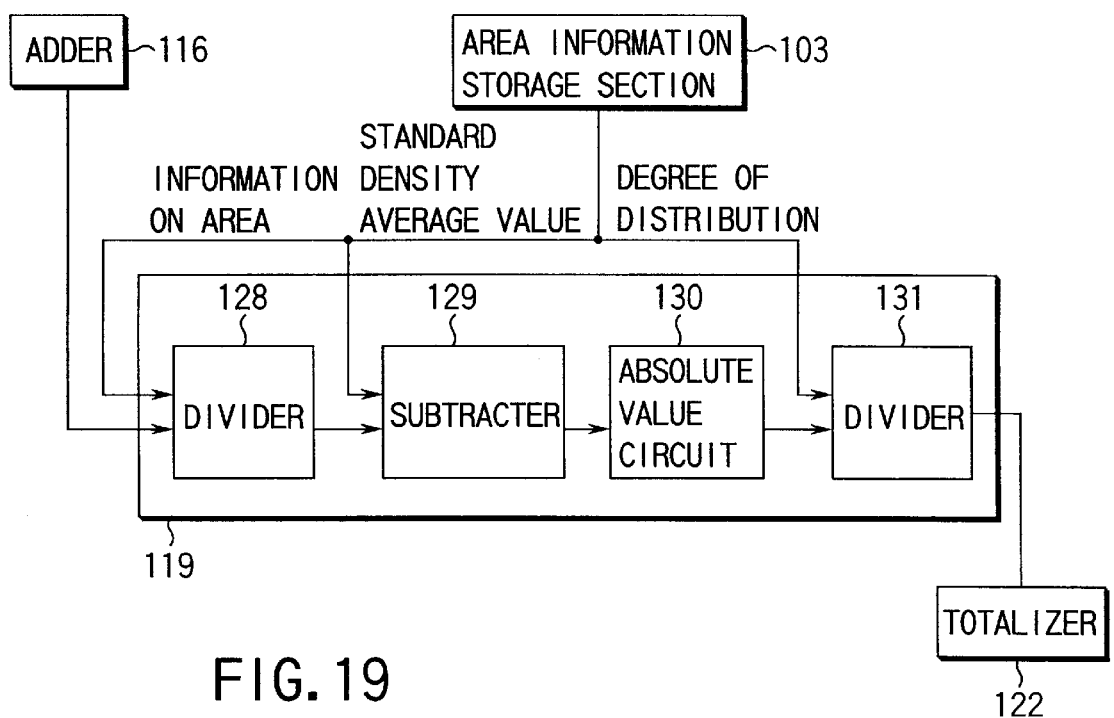
FIG. 19 is a detailed block diagram of the feature extracting section of FIG. 18.

The feature extracting section 119, 120, ..., 121 extract the amount of feature in the degree of stain necessary for examining the degree of stain on each target area on the printed matter P. FIG. 19 shows a detailed configuration of the feature extracting section 119. Because the feature extracting sections 120 and 121 have the same configuration as that of the feature extracting section 119, explanation of them will be omitted.

In FIG. 19, a divider 128 calculates a density average value by doing division using the density integral value for each target area on the printed matter P added at the adder 116 and the area of each target area obtained from the area information storage section 103.

Next, a subtracter 129 calculates the density difference between density average values by doing subtraction using the density average value for each target area on the printed matter P calculated by the divider 128 and the standard density average value for each target area on the printed matter P obtained from the area information storage section 103 (see equation 1). Next, the absolute value circuit 130 performs absolute value operation on the result of calculation from the subtracter 129.

Next, a divider 131 divides the density difference for each target area on the printed matter P subjected to the absolute value operation at the absolute value circuit 130 by the average standard deviation σ of the N average images. for each target area obtained from the area information storage section 103. In the division, the divider 131 calculates the density average value for each target area on the printed matter P and the deviation H of N average images (see equation 2).

Instead of using the deviation H as it is, the output value H may be made "1" or "0", depending on whether the degree of stain is high or low as follows:

If H≧k, then H=1,

If H<k, then H=0, where k is an integer.

While the feature extracting sections 119, 120, ..., 121 basically perform the same process, the feature extracting section 119, 120 and the feature extracting section 121 may perform different processes.

The totalizers, 122, 123, ..., 124 calculate the degree-of-stain decision value De for each target area (see equation 4) using the deviation H for each target area on printed matter P, the area S of each target area on the printed matter P obtained from the area information storage section 103, and the visual characteristic normalized coefficient K determined at the visual characteristic coefficient section 108.

The adder 125 adds the degree-of-stain decision value De for each target area on the printed matter P calculated at the totalizers 122, 123, ..., 124 and thereby calculates the degree of stain J on the whole surface of the printed matter P:

$$J = \Sigma De$$

where e is in the range of 1 to n (n is the number of target areas).

Using the degree of stain J calculated at the adder 125 and the judgment threshold value Jp in examination stored in the threshold value storage section 126, the judging section 127 outputs the result of examination as follow:

If J≧Jp, then it judges that the printed matter P is dirty.

If J<Jp, then it judges that the printed matter P is clean.

In this case, the judgment threshold value Jp can be set variously. Consequently, the result of the examination, for example, the rate of stain, can be set variously.

Of the degree-of-stain decision values De for the individual target areas on the printed matter P calculated by the totalizers 122, 123, . . . , 124, when the degree-of-stain decision value for at least one target area is extremely large, the judging section 127 may judge that the degree of stain is high.

Furthermore, of the amount of feature in the degree of stain for the individual target areas on the printed matter P obtained at the feature extracting sections 119, 120, . . . , 121, the amount of feature in the degree of stain for at least one target area is extremely large, the judging section may judge that the degree of stain is high.

Hereinafter, a fourth embodiment of the present invention will be explained.

Figure 20:
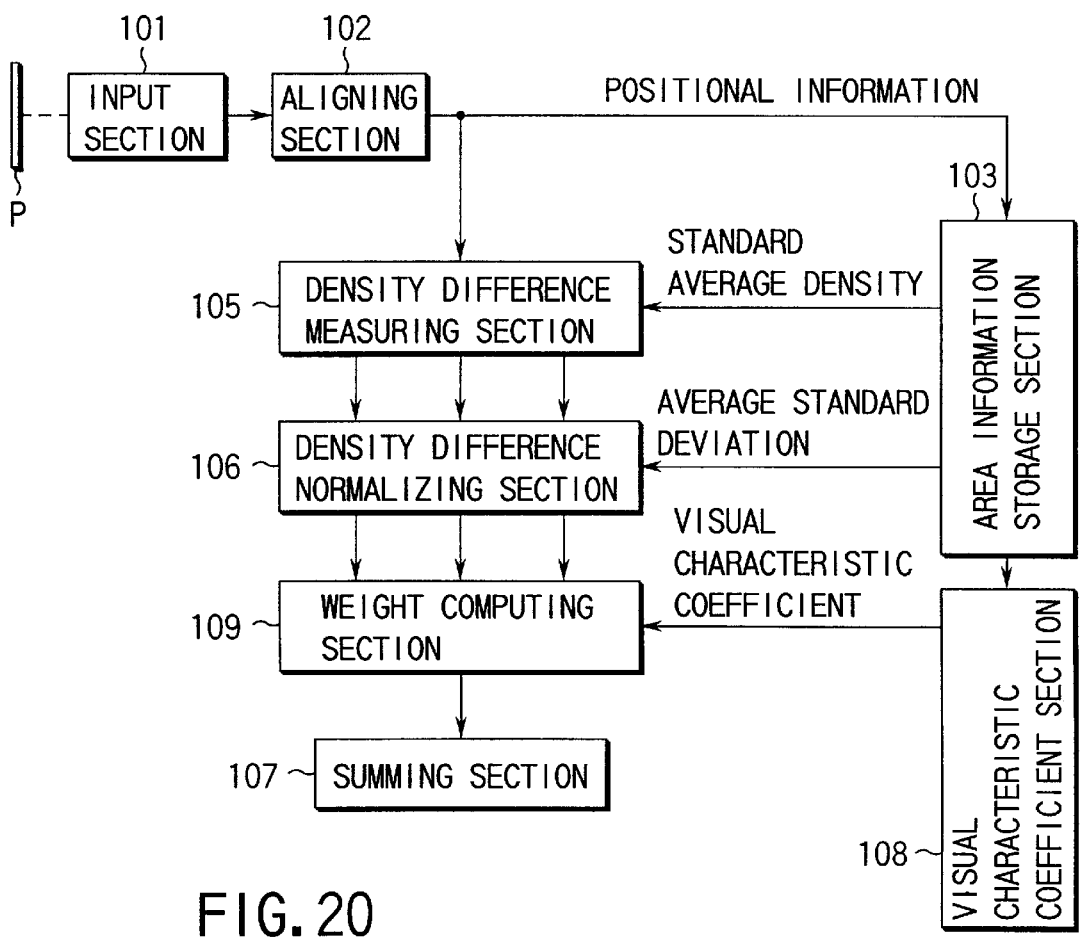
FIG. 20 is a schematic block diagram of an apparatus for examining the degree of stain on printed matter according to a fourth embodiment of the present invention.

FIG. 20 schematically shows the configuration of an apparatus for examining the degree of stain on printed matter according to a fourth embodiment of the present invention. The fourth embodiment is obtained by eliminating the average density computing section 104 from the second embodiment.

In the fourth embodiment, making the area of each target area on the printed matter P equal eliminates the need for information on the area of each target area stored in the area information storage section 103. Consequently, the fourth embodiment is effective in reducing the volume of information.

Specifically, a method of extracting a target area on the printed matter P is to extract a target area at intervals of a specific number of pixels (at regular intervals), for example, in blocks of m pixels×n pixels. In this case, the area of each target area on the printed matter P is constant.

Thus, the degree-of-stain decision value De is expressed as:

$$De(\text{the degree-of-stain decision value}) = He(\text{deviation}) \times Ke(\text{coefficient}).$$

Hereinafter, a fifth embodiment of the present invention will be explained.

An evaluation may be made using the decision value calculated on one side and that on the other side. In this case, of the: decision values on both sides, the result of examination on the side whose decision value is larger is used as the final result of the examination, which enables higher-accuracy degree-of-stain examination.

Figure 21:
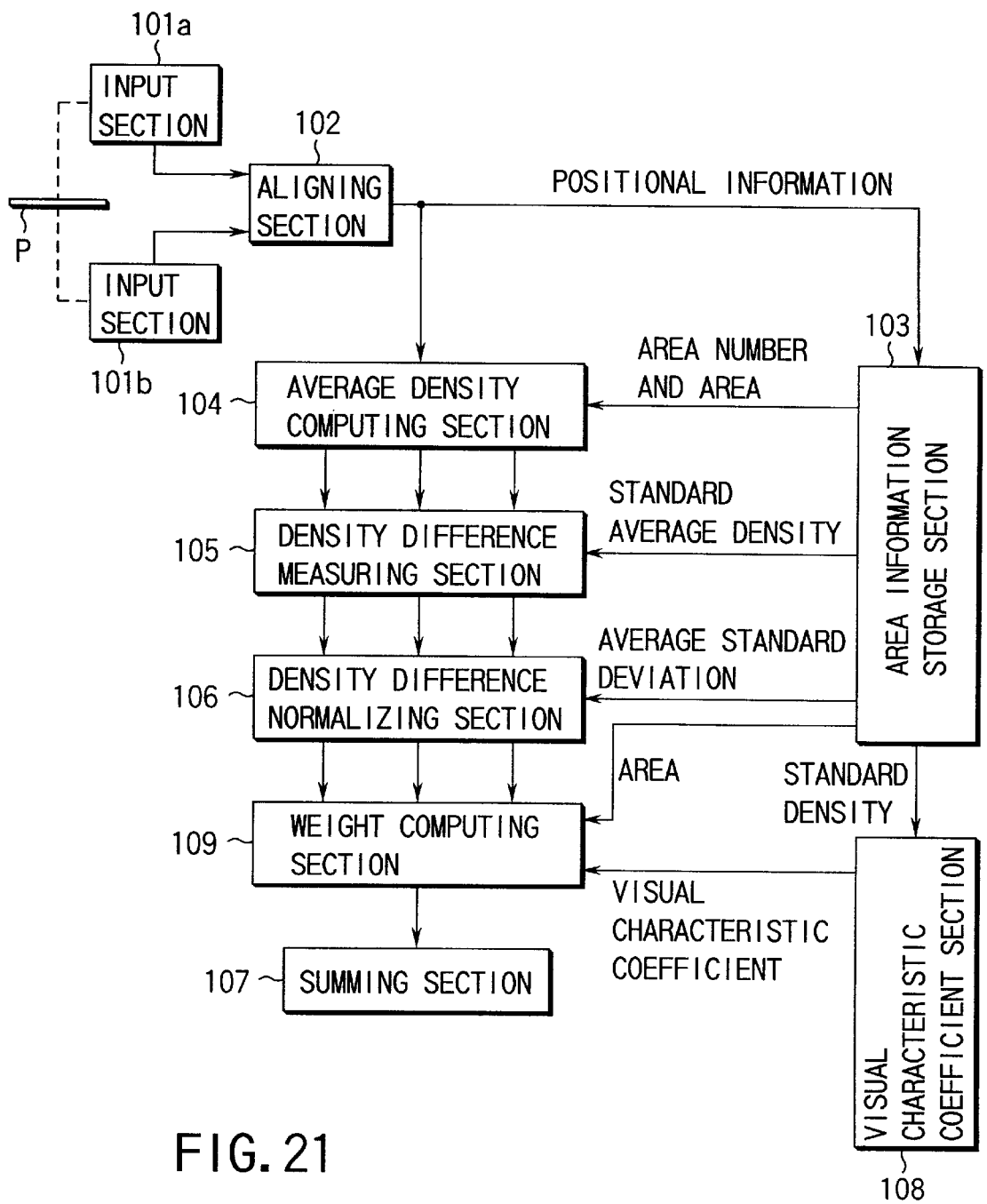
FIG. 21 is a schematic block diagram of an apparatus for examining the degree of stain on printed matter according to a fifth embodiment of the present invention.

FIG. 21 schematically shows the configuration of an apparatus for examining the degree of stain on printed matter according to the fifth embodiment of the present invention. In the fifth embodiment, two image input sections 101a, 101b are provided to examine both sides of the printed matter P. The fifth embodiment is such that the second embodiment is applied to both sides of the printed matter P.

Specifically, the individual sections 102 to 109 excluding the image input sections 101a, 101b perform the specific processes on the image data items on both sides of the printed matter P. Use of not only the result of examination on one side of the printed matter P but also that on the other side realizes a higher-accuracy examining apparatus. For example, when the normalized density difference added for only one side of the printed matter P both sides of which are printed is greater than a specific threshold value of the degree of stain, the summing section 107 judges that the degree of stain on the printed matter is high.

As described above, with the fifth embodiment, degree-of-stain-on-printed-matter examination can be made with as high accuracy as human senses by judging the degree of stain on the whole surface of the printed matter (the degree of dirtiness persons feel from the whole surface of the printed matter) on the basis of the degree of stain (deviation from a reference value) for at least two target areas on the printed matter, the area of each target area on the printed matter, and the target area characteristic coefficient corresponding to human senses for each target area on the printed matter.

Furthermore, pieces of printed matter can be arranged in the order of human senses, for example, in the order in which the cleanest one comes first and the dirtiest one comes last. Moreover, the degree of stain on one side and that on the other side may be evaluated and, on the basis of the evaluation, stains clustered only on one side may be examined.

The present invention is not limited to the above embodiments and may be practiced or embodied in still other ways without departing from the spirit or essential character thereof.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An apparatus for examining the degree of stain on printed matter, comprising:

image input means for inputting images including the image of printed matter to be examined and supplying image data on the printed matter;

area information storage means for storing positional information on at least two target areas on a standard image corresponding to said image of the printed matter, the area of each of the target areas, their standard average densities, and the degree of dispersion in their density distribution;

average density computing means for calculating the average density for each target area in said image data supplied from said image input means by using the positional information on each target area and the area of each target area supplied from said area information storage means;

density difference measuring means for measuring the density difference between the average density for each target area calculated by said average density computing means and said standard average density for each target area supplied from said area information storage means;

density difference normalizing means for normalizing the density difference for each target area by using the density difference for each target area measured at said density difference measuring means and the degree of dispersion in the density distribution for each target area supplied from said area information storage means; and summing means for summing the normalized density difference for each of said target areas supplied from said density difference normalizing means and thereby judging the degree of stain on said printed matter to be examined.

2. The apparatus according to claim 1, wherein said image input means includes means for judging the position of said image of the printed matter on the inputted image, aligning the position of said image of the printed matter to a specific position, and supplying the aligned image of the printed matter.

3. The apparatus according to claim 1, wherein said average density computing means includes addition means for supplying a density integral value by adding all the density values of the pixels in said target area in said image data supplied from said image input means and division means for dividing said density integral value by the area of said target area supplied from said area information storage means.

4. The apparatus according to claim 1, wherein said density difference normalizing means includes division means for dividing the density difference of the target area measured at said density difference measuring means by the standard deviation of said target area supplied from said area information storage means.

5. The apparatus according to claim 1, wherein said summing means includes addition means for adding the normalized density difference for each of said target areas supplied from said density difference normalizing means and judging means for judging the degree of stain on said printed matter by comparing the normalized density difference added by said addition means with a specific threshold value for the degree of stain.

6. The apparatus according to claim 1, wherein said summing means includes means for judging that the degree of stain on said printed matter is high, when said normalized density difference for at least one of said target areas supplied from said density difference normalizing means is much greater than that for any one of the other target areas.

7. The apparatus according to claim 6, wherein said image input means includes means for inputting images on both sides of said printed matter, and said judging means judges that the degree of stain on said printed matter is high, when said added normalized density difference for at least one side of said printed matter supplied from said density difference normalizing means is greater than said specific threshold value.

8. The apparatus according to claim 1, further comprising:

visual characteristic coefficient computing means for calculating a coefficient agreeing with human visual characteristics for the standard average density for each target area supplied from said area information storage means; and weighting means for calculating a degree-of-stain decision value for each target area by multiplying the normalized density difference for each target area supplied from said density difference normalizing means by the area of each target area supplied from said area information storage means, and further by said visual characteristic normalized coefficient supplied from said visual characteristic coefficient computing means, wherein said summing means includes addition means for adding the degree-of-stain decision value for each of said target areas supplied from said weighting means and judging means for judging the degree of stain on said printed matter by comparing the degree-of-stain decision value added by said addition means with a specific threshold value for the degree of stain.

9. The apparatus according to claim 1, wherein each of said target areas has an equal specific area and said apparatus further comprises:

visual characteristic coefficient computing means for calculating a coefficient agreeing with human visual characteristics for the standard average density for each target area supplied from said area information storage means; and weighting means for calculating a degree-of-stain decision value for each target area by multiplying the normalized density difference for each target area supplied from said density difference normalizing means by said visual characteristic normalized coefficient K supplied from said visual characteristic coefficient computing means, wherein said summing means includes addition means for adding the degree-of-stain decision value for each of said target areas supplied from said weighting means and judging means for judging the degree of stain on said printed matter by comparing the degree-of-stain decision value added by said addition means with a specific threshold value for the degree of stain.

10. The apparatus according to claim 9, wherein said visual characteristic coefficient computing means determines the reflectivity corresponding to said standard average density for each target area supplied from said area information storage means and calculates said visual characteristic normalized coefficient on the basis of the ratio of the individual reflectivities.

11. The apparatus according to claim 1, further comprising learning means which includes:

storage means for receiving images of said printed matter as an object of learning from said image input means and storing said images of said printed matter;

average image creating means for creating an average density value image on the basis of the images stored in said storage means;

labeling means for putting the same label on the pixels included in the same density range on said average density value image supplied from said average image creating mean;

area extracting, means for combining areas in the same density range where more than a specific number of pixels are consecutive on the images subjected to the labeling process by said labeling means, thereby extracting a target area on said printed matter, and supplying the number;of the target areas and their positional information;

area computing means for computing the area of each target area calculated by said area extracting means; and statistical value computing means for creating a density histogram for each of said average value images supplied from said average image creating means and calculating the average density and standard deviation for each target area, wherein said area information storage section stores the number of target areas and positional information supplied from said area extracting means, the area of each target area supplied from said area computing means, and the average density and average standard deviation for each target area supplied from said statistical value computing means.

* * * * *